United States Patent Office 2,795,090
Patented June 11, 1957

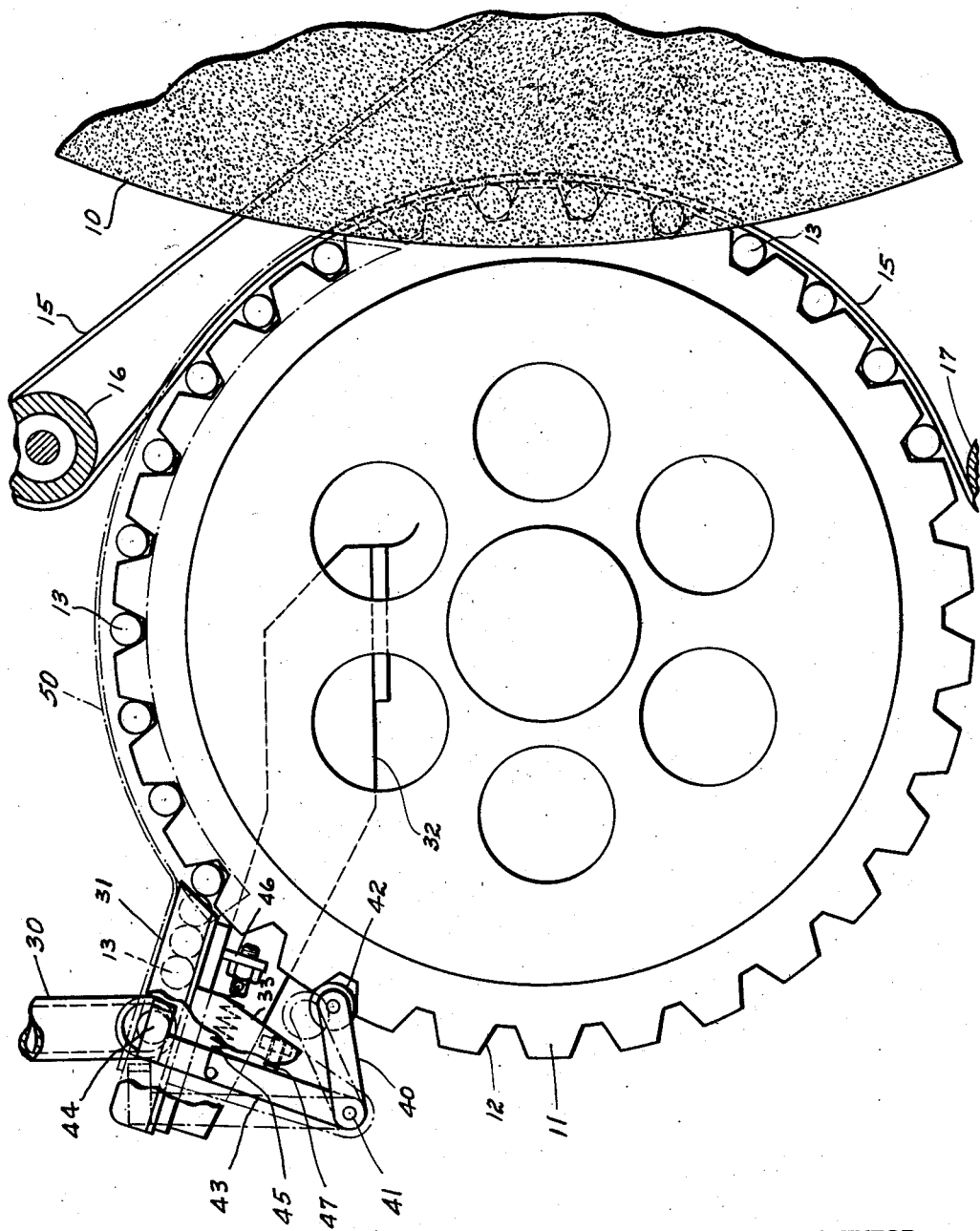

2,795,090
WORK FEED MECHANISM

Ernest P. Sterna, Beloit, Wis., assignor to Gardner Machine Company, Beloit, Wis.

Application May 26, 1954, Serial No. 432,489

3 Claims. (Cl. 51—215)

This invention relates to work feeding devices, particularly for feeding work pieces to a carrier which in turn conducts the work between the operative surface of two abrasive disks.

It is an object of this invention to provide means for feeding work pieces into peripherally spaced notches in a carrier member.

A further object is to provide means whereby a combination escapement and pusher device for advancing work pieces in the feeding mechanism is actuated by the rotation of the carrier member.

The drawing shows an end view of the work feeding device mounted in operative relation to the carrier member.

Since the invention herein relates only to the work feeder, all of the details of the grinding machine are not disclosed. For such details, reference is made to Patent 1,923,931, granted August 22, 1933, and Patent 2,398,463, granted April 16, 1946.

In the drawing numeral 10 indicates one of a pair of annularly opposed grinding wheels. Numeral 11 is a rotatable carrier having peripherally spaced notches 12 thereon for receiving work pieces 13 and carrying them through the space between the grinding wheels in order to grind the end surfaces thereof. The means for holding the work pieces in the notches as they pass through the point of operation is a well known device consisting of a chain or belt 15 operable on sprocket or pulley 16 and engaging the carrier over that portion of its travel when work pieces would be likely to drop out in the absence of such a retaining device. The work pieces 13, after passing through the grinding area, continue to be held in the carrier by chain 15 until they reach a point where they can be discharged at which point the chain passes over another sprocket 17 and out of contact with the carrier.

The means for feeding the work pieces to the carrier consists of a vertical chute 30 which discharges on to an angularly disposed chute 31 which in turn discharges into the notches of the carrier. Said chutes are mounted on a bracket 32 which in turn is suitably mounted on a portion of the machine (not shown). Bracket 32 has a depending portion 33 on which an arm 40 pivotally mounted on shaft 41 is directed toward the carrier and has a roller 42 thereon for engaging the peripheral surface of the carrier. An upwardly extending arm 43, also mounted on shaft 41, has a head portion 44 which serves to block chute 30 and also to move work pieces 13 along chute 31.

A guard member 50 is attached to the top of chute 31 and follows the curvature of the carrier up to the point where the carrier passes between the grinding wheels. Arms 40 and 43 are urged in a clockwise direction by a spring 45 attached at one end of arm 43 and at the other end by an adjustable anchor 46. An adjustable stop 47, in the path of arm 43, determines the limit of movement of both arms in a clockwise direction.

Operation

As the carrier 11 moves in a clockwise direction, roller 42 drops in a notch and permits arm 43 and head member 44 to move in a clockwise direction to urge a work piece into a preceding notch. In this position the head member 44 blocks vertical chute 30 and prevents the next work piece from dropping into chute 31. As the carrier continues to move, roller 42 rides out of the notch onto the peripheral surface of the carrier and in so doing, moves in a counter-clockwise direction to withdraw head member 44 on arm 43 so that another work piece may pass through vertical chute 30 on to angular chute 31.

I claim:

1. A device for automatically introducing work pieces into a machine tool including a rotatable carrier member having peripherally spaced portions for receiving work pieces, a feeding mechanism for supplying work pieces to said carrier including a chute, work pushing means for moving pieces along said chute in the direction of said carrier and means operated by cam action with said work receiving portions for actuating said pushing means.

2. A device for automatically introducing work pieces into a machine tool including a rotatable carrier member having peripherally spaced portions for receiving work pieces, a feeding mechanism for supplying work pieces to said carrier including means for guiding a workpiece toward said carrier, resilient actuating means for advancing workpieces along said guide means and means operable by engagement with the peripheral surface of said carrier for holding said work moving member in retracted position against said resilient means, said means being operable upon engagement with one of said work receiving portions for releasing said work moving member to the action of said resilient means to advance a workpiece into a preceding work receiving portion.

3. A device for automatically introducing workpieces into a machine tool including a rotatable carrier member having peripherally spaced portions for receiving workpieces, a feeding mechanism for supplying workpieces to said carrier including a chute, means for moving workpieces along said chute in the direction of said carrier including a work engaging member, resilient means for urging said work engaging member against said workpieces, and means attached to said work engaging member and engaging said spaced portions on said carrier for retracting said work engaging member against the action of said resilient means.

References Cited in the file of this patent

UNITED STATES PATENTS

| | | |
|---|---|---|
| 632,125 | Kershaw | Aug. 29, 1899 |
| 652,165 | Campbell | June 19, 1900 |
| 828,176 | Bailey | Aug. 7, 1906 |
| 1,159,696 | Matteson | Nov. 9, 1915 |
| 1,926,974 | Einstein | Sept. 12, 1933 |
| 2,246,675 | Gronemeyer | June 24, 1941 |
| 2,405,367 | Nichols | Aug. 6, 1946 |
| 2,579,468 | Brillhart | Dec. 25, 1951 |

FOREIGN PATENTS

| | | |
|---|---|---|
| 626,370 | Great Britain | July 14, 1949 |